United States Patent [19]

Stapleton

[11] Patent Number: 5,680,975

[45] Date of Patent: Oct. 28, 1997

[54] RACK MOUNTING SUPPORT

[75] Inventor: Craig A. Stapleton, Clarkston, Mich.

[73] Assignee: Advanced Accessory Systems LLC, Port Huron, Mich.

[21] Appl. No.: 554,528

[22] Filed: Nov. 7, 1995

[51] Int. Cl.⁶ .................................................. B60R 9/10
[52] U.S. Cl. ........................... 224/519; 224/521; 224/924; 280/515
[58] Field of Search ................................ 224/426, 516, 224/518, 519, 521, 547, 924; 280/292, 304.5, 514, 515

[56] References Cited

U.S. PATENT DOCUMENTS

| | | | |
|---|---|---|---|
| 2,981,554 | 4/1961 | Mulder et al. | 224/547 X |
| 3,796,333 | 3/1974 | Goldstein | 224/521 X |
| 3,998,471 | 12/1976 | Lutchemeier | 280/515 X |
| 4,301,953 | 11/1981 | Abbott | 224/42.03 |
| 4,337,882 | 7/1982 | Hampton | 224/519 |
| 4,380,344 | 4/1983 | Abbott | 280/402 |
| 4,394,947 | 7/1983 | Tartaglia | 224/42.43 |
| 4,461,410 | 7/1984 | Tartaglia | 224/42.03 |
| 4,646,952 | 3/1987 | Timmers | 224/924 |
| 4,676,413 | 6/1987 | Began et al. | 224/924 |
| 4,676,414 | 6/1987 | Deguevara | 224/42.03 |
| 5,190,195 | 3/1993 | Fullhart et al. | 224/519 X |

OTHER PUBLICATIONS

1994 Product Application & Towing Accessory Catalog, Reese Trailer Hitches and Towing Accessories.

Hitch Applications and Accessories, Draw-Tite, Inc. brochure—1993.

*Primary Examiner*—Renee S. Luebke
*Attorney, Agent, or Firm*—Rader Fishman & Grauer PLLC

[57] ABSTRACT

A rack mounting support adapted for use with hitchless vehicles. The mounting support has a mount in the form of a receiving member and a socket member wherein the receiving member is attached onto a vehicle's frame members to minimize reduction of a vehicle's ground clearance. The socket member and frame member are dimensioned to allow the frame member to remain securely inserted within the socket member and facilitate a person to attach the frame member to the socket member without having to simultaneously support the frame member.

19 Claims, 2 Drawing Sheets

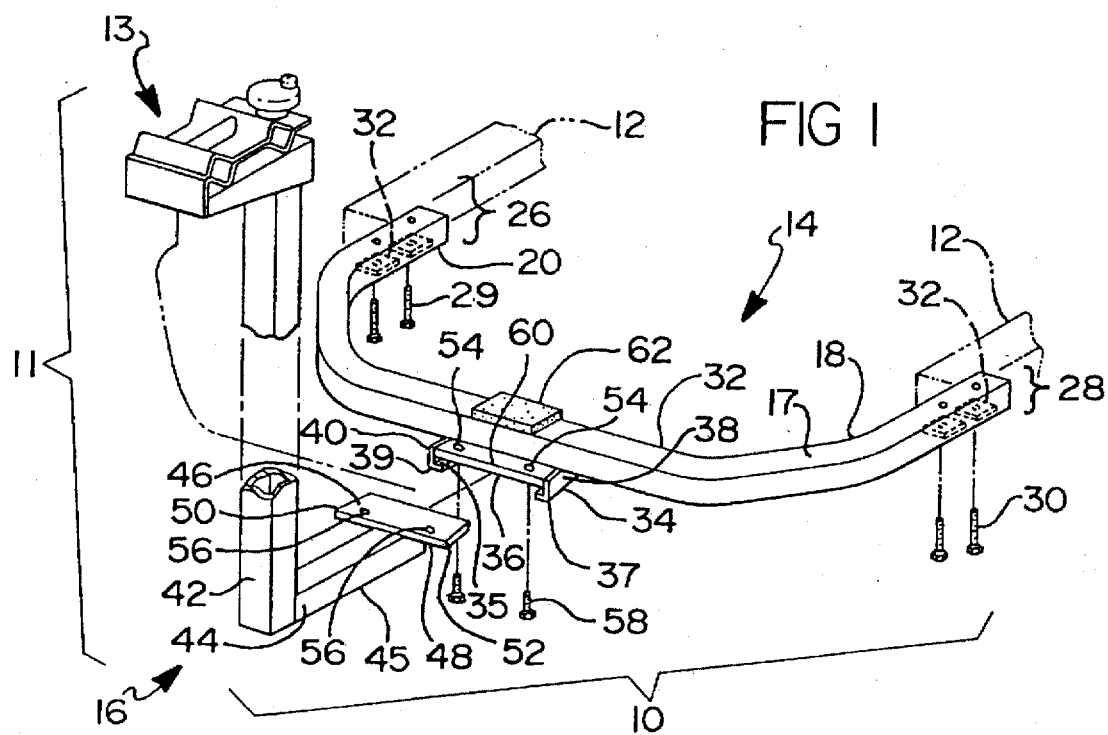
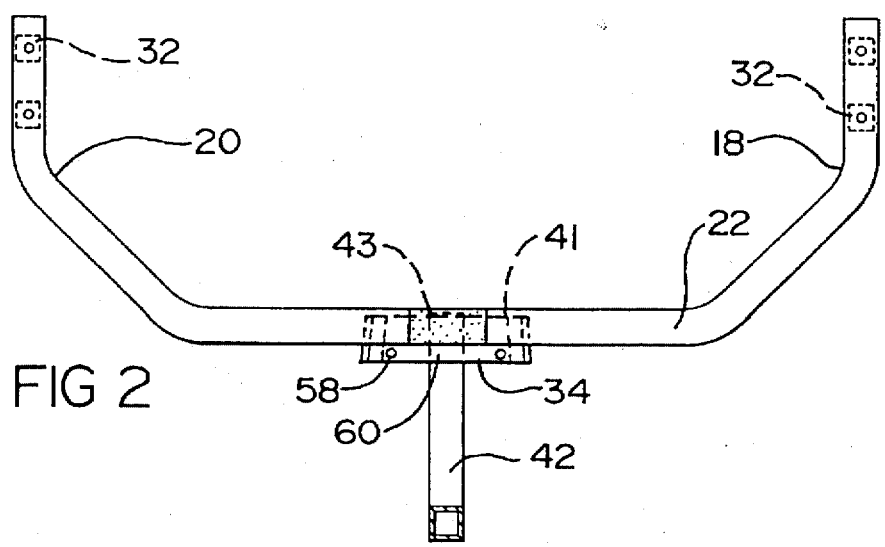

RACK MOUNTING SUPPORT

TECHNICAL FIELD

This invention relates generally to a rack support mounted on a motor vehicle's underbody frame, and more particularly to a rack mounting support for hitchless vehicles.

BACKGROUND ART

Article racks for motor vehicles have become an invaluable tool to facilitate transportation of a variety of objects. With the use of a rack, bulky objects can be carried along with ease, objects which may not otherwise fit within the interior of a vehicle. Sports enthusiasts have long recognized the benefits associated with attaching a rack to their vehicle, to readily allow one to transport sports related equipment such as bikes, skis and the like.

Prior art racks range in size, shape and stylistic features. However, as a result of their mounting arrangement, prior art racks have limited utility. Article racks are generally designed to mount onto a vehicle hitch. Some prior art racks are adapted to attach onto receiver type hitches while others are adapted for mounting onto tongue hitches. A tongue hitch typically is a relatively flat apertured plate. A ball is attached to the tongue by inserting a stud connected to the ball through an aperture of the plate and securing it in place with a nut. In contrast, a receiver hitch has a rearwardly projecting rectangular tube that is usually square in shape. A tube carrying a ball is selectively received in telescopic relation with the rearwardly projecting tube and held in place by a suitable pin.

U.S. Pat. No. 5,303,857 discloses a rack mounting support for trailer hitch supplied vehicles in which the rack is supported by a ball hitch tongue.

U.S. Pat. No. 5,219,105 discloses a vehicle mountable carrier capable of mounting on either a tongue or tubular trailer hitch or a bumper.

Prior art racks or carriers that mount on trailer hitches cannot be universally used and cannot mounted on many car designs. Most compacts, subcompacts, and sports cars ride low to the ground and thus have low ground clearance. Vehicle hitches are generally mounted to the rear, underside of the vehicle, positioned beneath and extending beyond the rear bumper of the vehicle. As a result, vehicle hitches are impractical for cars that are not designed for towing or cars with a low ground clearance because the vehicle hitch itself cannot be elevated sufficiently to prevent the hitch and/or any object attached to the hitch to clear the ground. Thus, many prior art racks cannot be used with hitchless vehicles.

Other prior art racks have also been difficult to attach to a vehicle. Racks or carriers are typically cumbersome. Prior art mounting arrangements have required that during attachment a person hold the rack in place, with all of its weight, while fastening the rack to the vehicle hitch, an unmanageable task for one person.

In addition, other prior art racks attach onto the bumper to secure the rack to the vehicle. One problem associated with such a design is that when the rack is attached to the bumper, the bumper bears the load of the rack which reduces and in some cases eliminates its ability to withstand impact. Under current federal regulations, vehicle bumpers must be designed to meet specified vehicle impact standards. These standards are compromised when the vehicle bumper is bearing the load of the rack to an extent that the bumper can no longer support the additional load of an impact.

There is accordingly a need for a rack designed to mount onto hitchless vehicles. More specifically, there is a need for a rack mounting support that accounts for the specific structural and design features characteristic of hitchless vehicles to provide a secure and easy method for attaching an article rack without a vehicle hitch.

SUMMARY OF THE INVENTION

It is an object of the invention to provide a rack mounting support adapted for use on hitchless vehicles.

Another object of the invention is to provide a rack support designed for mounting onto hitchless vehicles wherein the rack support is hidden underneath the vehicle for aesthetic appeal.

It is an additional object of the invention to provide a rack support for mounting onto hitchless vehicles wherein the rack support is structurally able to secure a rack and any objects attached thereto while accommodating a vehicle's low ground clearance.

It is a further object of the invention to provide a rack mounting support for hitchless vehicles that is easy to mount.

In carrying out the above stated objects, the present invention includes a rack with a carrier and a rack mounting support, designed for use with hitchless vehicles. The rack mounting support includes a mount preferably in the form of a receiving member having at least one coupler for attaching the receiving member to at least one frame member of the vehicle, and a socket member. Preferably, the socket member is shaped such that it has a substantially longer length than width and a depth substantially less than either the length or the width. The rack mounting support also includes a support having a frame member that carries a plug and supports the carrier at a free end. The plug preferably includes a plate sized to be suitably received in the socket member so that the plate is fully supported within the socket member. The rack mounting support further includes fasteners to fixedly attach the plate in the socket member.

BRIEF DESCRIPTION OF THE DRAWINGS

The present invention will be more clearly understood by reference to the following detailed description when read in conjunction with the accompanying drawings in which like reference characters refer to like parts throughout the views and in which:

FIG. 1 is an exploded perspective view of a rack mounting support according to the present invention in a non-engaged position;

FIG. 2 is a top plan view of the rack mounting support shown in FIG. 1;

BEST MODE FOR CARRYING OUT THE INVENTION

Figure 3:
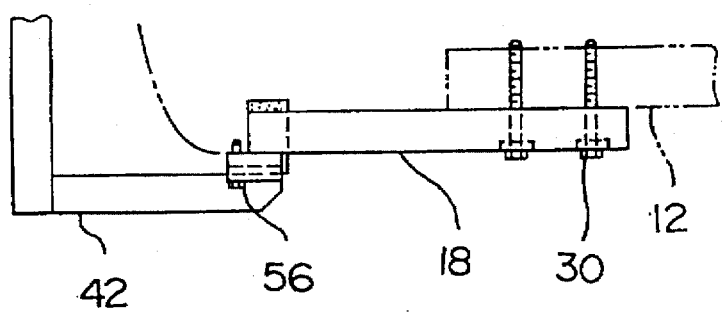
FIG. 3 is a side perspective view of the rack mounting support shown in FIG. 1 and illustrating the way in which the frame member is engaged within the socket member.
Figure 4:
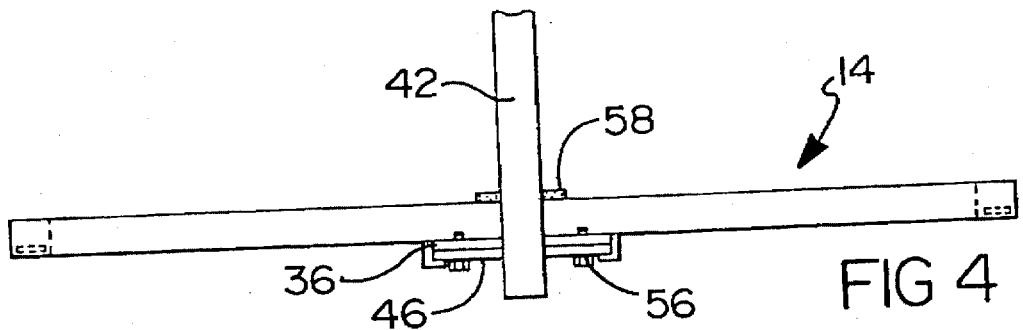
FIG. 4 is a front view of the rack mounting support shown in FIGS. 1–3 which illustrates the rack in an engaged position.

Illustrated in FIG. 1 is a rack 11 with the rack mounting support 10 of the present invention. The rack mounting support 10 is shown attached to the underbody of a vehicle 19, preferably, a vehicle's frame members 12. The rack mounting support 10 includes a mount 14 and a support 16. The mount 14 is preferably in the form of a receiving member 24. The support 16 is preferably in the form of a frame member 25. The frame member 25 is preferably carried by the receiving member 24. The rack 11 also includes a carrier 13, for bikes, skis, luggage or the like such as the bike carrier 15 shown in the preferred embodiment, which is joined to the rack mounting support 10.

The mount 14 of the preferred embodiment includes a receiving member 24 preferably formed from a generally U-shaped tube 17 with a first end 18 and a second end 20. The receiving member 24 preferably has a connector leg 31 of the tube 17 positioned between the first and second ends 18 and 20. The first end 18 and second end 20 are each provided with couplers 26, 28 for attaching the receiving member 24 to at least one frame member 12 of the vehicle 19. The receiving member 24 is preferably a single unitary piece wherein the first and second ends are substantially parallel to one another.

The couplers for attaching 26, 28 preferably include a threaded bolt 29, 30 and a nut 32 assembly. The receiving member 24 preferably includes at least one threaded aperture in each of the first and second ends 18 and 20, a threaded bolt 28, 30 extending through the apertures in the first and second ends, and threadably engaged into the vehicle's frame members 12. A nut 32 attaches to the threaded bolt 28, 30 and the first and second ends 18, 20 of the receiving member 24. The nut is preferably fitted within the interior of the receiving member 24, as depicted in FIG. 1.

As shown in FIG. 3, the first and second ends 18 and 20 of the receiving member 14 are preferably attached underneath the vehicle's frame members 12. Alternatively, the first and second ends of the receiving member can be attached to the side of the frame members of the vehicle 12, to accommodate different vehicle designs.

As shown in FIG. 1, a socket member 34 is attached between the first and second ends of the receiving member. The socket member 34 is preferably attached to the bottom side of the connector leg 31. The socket member 34 is most preferably attached such that the socket member 34 is positioned substantially equidistant from the first and second ends 18 and 20. The socket member 34 in the preferred embodiment is attached substantially near the center of the connector leg 31. The socket member 34 is preferably welded onto the U-shaped tube 17, at the center of the connector leg 31, so that the load on the socket member 34 is evenly distributed between the two frame members of the vehicle 12.

As depicted in FIG. 1, the socket member 34 has a channel 35. Preferably, the socket member 34 has a substantially longer length 36 than width 38 and a depth 40 substantially less than either the length or width of the socket member 34. Accordingly, the socket member 34 is preferably formed by spaced apart L-shaped brackets 37 and 39 secured to a support plate 41, shown in FIG. 2, to provide an elongated horizontal C-shaped slot. The brackets 37 and 39 preferably taper toward each other in the direction of the receiving member ends 18 and 20 as shown in FIG. 2, and terminate at a stop plate 43. The socket member 34 is shaped to allow the socket member 34 to temporarily bolster the frame member 25 while the frame member 25 and the socket member 34 are fixedly fastened together.

The support 16 includes a frame member 25 that has a free end to support the rack 13 and carries a plug 45 for reception in the mount 14. Preferably, the plug 45 is formed by a plate 46. The frame member 25 preferably has a first leg 42 and a second leg 44. The first leg 42 preferably has a free end that supports the rack 13, and a second leg 44 with a plate 46 attached thereon, wherein the first and second legs are preferably at substantially right angles to one another. Consequently, the frame member 25 is preferably L-shaped. The plug 45 includes the second leg 44 and the plate 46, wherein the plate is sized such that it can be suitably supported within the channel 35 of the socket member 34. Accordingly, the plate 46 also has a substantially longer length 48 than width 50 and a depth 52 substantially less than either the length or width of the plate 46. The plate 46 is also tapered, such that the width ends 50 taper toward each other. The plate 46 preferably tapers to the same or a greater degree than the L-shaped brackets 37 and 39 of the socket member 34. To provide a tolerance that eases installation, additional space is provided on either side of the plate 46 as the plate 46 is initially inserted within the socket member 34. The stop plate 43 in combination with the tapered plate 46 and brackets 37 and 39 ensures that the plate 46 fits fully within the socket member 34 and aligns the fastening holes in registration with each other.

In the support 16 of the preferred embodiment, the plate 46 and the socket member 34 fasteners fixedly attach. The plate 46 and the socket member 34 preferably have at least one pair of apertures provided therein. As shown in FIG. 1, aperture 54 is provided within the socket member 34 and aperture 56 is provided within the plate 46. The apertures within the plate and socket member are positioned so that they are aligned when the plate 46 is completely inserted within the socket member 34. The fastener 58 is preferably a bolt threadably inserted within aligned apertures 54 and 56 within the plate 46 to attach the plate and the socket member when the plate is fully inserted into the socket member and in mating engagement with the stop plate 43. In the most preferred embodiment, the socket member 34 has an overhang portion 60 and at least one pair of apertures 54 are provided within the overhang portion 60 of the socket member. The fastener 58 thus links the apertures on the plate with the apertures of the overhang portion 60 of the socket member.

The embodiment of FIG. 1 also shows a shock pad 62 which is preferably mounted on the connector leg 31 of the receiving member 14. The shock pad 62 is preferably mounted on the top side of the connector leg 31, opposite the socket member, to interact with the underside of vehicle 19 and act as a shock absorber for the rack by reducing the vibrations of the rack, and thus reducing the sound which results from vibrating metal components. Prior art racks often offer an interference fit where the rack is mounted onto the bumper to minimize vibration. While vibration is controlled with such a design the purpose of the bumper is thwarted. Under federal regulations bumpers have to be able to withstand certain impacts. The installation of a rack on the bumper interferes with the ability of the bumper to absorb the impact, as much of the bumper load capabilities are then used to carry the rack. As a result, the use of a shock pad ensures that the rack mounting support does not obstruct the function of a bumper.

The shape of the socket member 34 allows the plate 46 to be adequately supported within the socket member, so that the plate remains engaged within the socket member, allowing a person to fixedly attach the frame member 16 to the socket member by fasteners 58 without having to simultaneously support the weight of the rack. This design allows one person to attach the rack to a vehicle and does not require that one person hold and support the rack support while another attaches the support onto the vehicle.

Modifications and variations can be made to the disclosed embodiments without deviating from the invention as defined in the following claims. Although a single preferred embodiment of the invention has been illustrated and described, it is not intended to limit the scope of the invention to this embodiment and it will be appreciated that other embodiments can be derived by changes in size, shape and substitution of parts without departing from the spirit of the invention.

What is claimed is:

1. A rack mounting support for a vehicle having frame members, said rack mounting support comprises:

a mount having a receiving member provided with a coupler for attaching said receiving member to at least one frame member of the vehicle, said receiving member having a first end and a second end;

a socket member carried by the receiving member, said socket member having a substantially longer length than width and a depth substantially less than either said length or said width, said socket member formed by spaced apart L-shaped brackets secured to a support plate;

a support having a frame member with a free end to support a carrier and carrying a plug correspondingly dimensioned to said socket member; and fasteners for fixedly attaching said plug in said socket member.

2. The rack mounting support of claim 1, wherein said receiving member is a U-shaped unitary piece.

3. The rack mounting support of claim 1, wherein said receiving member is a tube.

4. The rack mounting support of claim 1, wherein said receiving member is mounted underneath the vehicle's frame members.

5. The rack mounting support of claim 1, wherein said coupler for attaching further comprises at least one threaded bolt through each of said first and second ends of said receiving member and into the vehicle's frame members and comprising a nut between said receiving member and the vehicle's frame member to support said threaded bolt.

6. The rack mounting support of claim 1, wherein said socket member is a C-shaped horizontal elongated slot.

7. The rack mounting support of claim 1, wherein said L-shaped brackets are tapered towards each other.

8. The rack mounting support of claim 1, wherein a plug plate has a tapered width sized to be securedly received within said socket member.

9. The rack mounting support of claim 1, wherein a stop plate joins said L-shaped brackets.

10. The rack mounting support of claim 1, wherein said receiving member has a connector leg positioned between said first and second ends, said connector leg having a top and a bottom side.

11. The rack mounting support of claim 10, wherein said socket member is attached onto said bottom side of said connector leg.

12. The rack mounting support of claim 10, wherein said socket member is attached on said connector leg such that said socket member is substantially equidistant from each of said first and second ends of said receiving member.

13. The rack mounting support of claim 10, wherein said connector leg has a shock pad attached on said top side of said connector leg.

14. The rack mounting support of claim 1, wherein said frame member includes first and second end legs, said first and second end legs substantially at right angles to each other, such that said frame member is L-shaped.

15. The rack mounting support of claim 14, wherein said plug has a plug plate with a substantially longer length than width and a depth substantially less than either said length or said width.

16. The rack mounting support of claim 15, wherein said plug plate and said socket member have provided therethrough at least one pair of apertures that are aligned when said plug plate is completely inserted within said socket member.

17. The rack mounting support of claim 16, wherein said fasteners comprise a bolt threadably inserted within said pair of aligned apertures to fasten said plug plate within said socket member.

18. A rack for a vehicle having frame members, said rack comprises:

a rack mounting support, said rack mounting support further comprises:

a mount having a receiving member with a first and second end, each of said first and second ends being provided with couplers for attaching said receiving member to at least one frame member of the vehicle;

a socket member positioned between said first and second ends of said receiving member, said socket member having a substantially longer length than width and a depth substantially less than either said length or said width, said socket member formed by spaced apart L-shaped brackets tapered towards each other and secured to a support plate, and having a stop plate joining said L-shaped brackets;

a support having a frame member with a plug and a free end to support a rack, said plug having a plug plate sized such that said plug plate is fully supported within said socket member;

fasteners for fixedly attaching said plug plate in said socket member; and a carrier joined to said rack mounting support.

19. A rack mounting support for a vehicle having frame members, said rack mounting support comprises:

a mount having a receiving member provided with a coupler for attaching said receiving member to at least one frame member of the vehicle, said receiving member having a first end and a second end;

a socket member carried by the receiving member, said socket member having a substantially longer length than width and a depth substantially less than either said length or said width, said socket member formed by spaced apart L-shaped brackets tapered towards each other and secured to a support plate, and having a stop plate joining said L-shaped brackets;

a support having a frame member with a free end to support a carrier and carrying a plug correspondingly dimensioned to said socket member; and fasteners for fixedly attaching said plug in said socket member.

* * * * *